(12) United States Patent
Okabe (10) Patent No.: US 10,875,520 B2
(45) Date of Patent: Dec. 29, 2020

(54) HYBRID VEHICLE

(71) Applicant: Toyota Jidosha Kabushiki Kaisha, Toyota (JP)

(72) Inventor: Yasuaki Okabe, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 204 days.

(21) Appl. No.: 16/226,343

(22) Filed: Dec. 19, 2018

(65) Prior Publication Data

US 2019/0193716 A1 Jun. 27, 2019

(30) Foreign Application Priority Data

Dec. 21, 2017 (JP) ................................. 2017-244832

(51) Int. Cl.
| | |
|---|---|
| *B60W 30/188* | (2012.01) |
| *B60L 15/20* | (2006.01) |
| *B60L 15/38* | (2006.01) |
| *B60W 20/13* | (2016.01) |
| *B60K 6/365* | (2007.10) |
| *B60L 50/60* | (2019.01) |
| *B60W 10/08* | (2006.01) |

(52) U.S. Cl.
CPC ............ *B60W 20/13* (2016.01); *B60K 6/365* (2013.01); *B60L 15/20* (2013.01); *B60L 15/38* (2013.01); *B60L 50/60* (2019.02); *B60W 10/08* (2013.01); *B60W 30/1884* (2013.01); *B60L 2220/42* (2013.01)

(58) Field of Classification Search
None
See application file for complete search history.

(56) References Cited

U.S. PATENT DOCUMENTS

| | | | | |
|---|---|---|---|---|
| 2009/0157245 | A1* | 6/2009 | Moon | B60W 20/13 701/22 |
| 2009/0290270 | A1* | 11/2009 | Ganev | H02P 9/006 361/21 |
| 2013/0297126 | A1* | 11/2013 | Yamazaki | B60W 10/06 701/22 |
| 2014/0015257 | A1* | 1/2014 | Dobbs | F02D 41/0007 290/40 B |

(Continued)

FOREIGN PATENT DOCUMENTS

| | | |
|---|---|---|
| JP | 2016-074233 A | 5/2016 |
| JP | 2017-035922 A | 2/2017 |

*Primary Examiner* — Kevin P Mahne (74) *Attorney, Agent, or Firm* — Dinsmore & Shohl LLP (57) ABSTRACT

The hybrid vehicle performs battery-less drive control to control an engine such that the engine is autonomously operated at an autonomous operation rotation speed, to control a first motor such that a torque based on a driving force required for a run of the hybrid vehicle is output from the first motor, and to control a second motor such that an electric power by subtracting an auxiliary machinery power from an electric power charged or discharged by the first motor is charged or discharged by the second motor. During the battery-less drive control, when a rotation speed of the engine becomes lower than a first predetermined rotation speed that is lower than the autonomous operation rotation speed, the hybrid vehicle performs torque adjustment control to decrease an absolute value of the torque output from the first motor.

7 Claims, 5 Drawing Sheets

(56) References Cited

U.S. PATENT DOCUMENTS

| | | | |
|---|---|---|---|
| 2014/0148984 A1* | 5/2014 | Nishi | B60W 20/10 |
| | | | 701/22 |
| 2014/0303823 A1* | 10/2014 | Nakanishi | B60W 20/00 |
| | | | 701/22 |
| 2015/0139767 A1* | 5/2015 | Moriki | E02F 3/431 |
| | | | 414/699 |
| 2016/0229309 A1* | 8/2016 | Mitsutani | B60L 3/0084 |
| 2017/0036672 A1 | 2/2017 | Takuda | |
| 2018/0105159 A1* | 4/2018 | Park | B60L 58/12 |

\* cited by examiner

HYBRID VEHICLE

CROSS-REFERENCE TO RELATED APPLICATIONS

The present disclosure claims priority to Japanese Patent Application No. 2017-244832 filed Dec. 21, 2017, which is incorporated herein by reference in its entirety including specification, drawings and claims.

TECHNICAL FIELD

The present disclosure relates to a hybrid vehicle.

BACKGROUND

A proposed configuration of a hybrid vehicle includes a first motor; an engine; a planetary gear mechanism configured such that three shafts, i.e., a rotating shaft of the first motor, an output shaft of the engine and a driveshaft coupled with an axle are connected with three rotational elements of the planetary gear mechanism in this sequence in an alignment chart; a second motor configured to input and output power from and to the driveshaft; and a battery configured to transmit electric power to and from the first motor and the second motor (as described in, for example, JP 2016-74233A). During a battery-less drive in which the hybrid vehicle is driven with separation of the battery in a very cold time, this hybrid vehicle sets a larger value than an ordinary value (i.e., a smaller value as the absolute value) to an output lower limit value of the first motor. This limits a torque of reducing the rotation speed of the engine and suppresses the occurrence of an engine stall due to an insufficiency of the output from the engine.

SUMMARY

The hybrid vehicle of the above configuration is likely to have an engine stall when an accelerator pedal is pressed down during the battery-less drive. Pressing down the accelerator pedal increases a required torque that is required for a run of the hybrid vehicle. A need for outputting this increased required torque increases absolute values of torques of the first motor and the second motor. The first motor acts in a direction of suppressing an increase in the rotation speed of the engine. An abrupt increase in the absolute value of the torque of the first motor decreases the rotation speed of the engine and may even cause an engine stall. During the battery-less drive, the power required for the run and an auxiliary machinery power are supplied by the engine output. The occurrence of an engine stall causes a trouble in driving auxiliary machines, as well as a trouble in driving the hybrid vehicle.

A hybrid vehicle of the present disclosure mainly aims to suppress the occurrence of an engine stall during a battery-less drive.

In order to achieve the above primary object, the hybrid vehicle of the present disclosure employs the following configuration.

The present disclosure is directed to a hybrid vehicle. The hybrid vehicle includes a first motor configured to input and output power, an engine, a planetary gear mechanism configured such that three shafts, i.e., a rotating shaft of the first motor, an output shaft of the engine and a driveshaft coupled with an axle are connected with three rotational elements of the planetary gear in this sequence in an alignment chart, a second motor configured to input and output power from and to the driveshaft, a battery connected with power lines, which are connected with the first motor and the second motor, and configured to transmit electric power to and from the first motor and the second motor, a system main relay configured to connect and disconnect the battery with and from the power lines and a control device configured to perform battery-less drive control when the hybrid vehicle is driven in an off state of the system main relay. The battery-less drive control controls the engine such that the engine is autonomously operated at an autonomous operation rotation speed, controls the first motor such that a torque based on a driving force required for a run of the hybrid vehicle is output from the first motor, and controls the second motor such that an electric power by subtracting an auxiliary machinery power from an electric power charged or discharged by the first motor is charged or discharged by the second motor. During the battery-less drive control, when a rotation speed of the engine becomes lower than a first predetermined rotation speed that is lower than the autonomous operation rotation speed, the control device performs torque adjustment control to decrease an absolute value of the torque output from the first motor.

The hybrid vehicle of this aspect comprises the first motor configured to input and output power; the engine; the planetary gear mechanism configured such that the three shafts, i.e., the rotating shaft of the first motor, the output shaft of the engine and the driveshaft coupled with the axle are connected with the three rotational elements of the planetary gear in this sequence in the alignment chart; the second motor configured to input and output power from and to the driveshaft; the battery connected with the power lines, which are connected with the first motor and the second motor, and configured to transmit electric power to and from the first motor and the second motor; and the system main relay configured to connect and disconnect the battery with and from the power lines. The hybrid vehicle of this aspect performs the battery-less drive control when the hybrid vehicle is driven in the off state of the system main relay. The battery-less drive control controls the engine such that the engine is autonomously operated at the autonomous operation rotation speed, controls the first motor such that the torque based on the driving force required for a run of the hybrid vehicle is output from the first motor, and controls the second motor such that the electric power by subtracting the auxiliary machinery power from, the electric power charged or discharged by the first motor is charged or discharged by the second motor. During the battery-less drive control, when the rotation speed of the engine becomes lower than the first predetermined rotation speed that is lower than the autonomous operation rotation speed, the hybrid vehicle of this aspect performs the torque adjustment control to decrease the absolute value of the torque output from the first motor. The first motor acts in a direction of suppressing an increase in the rotation speed of the engine. Performing the torque adjustment control to decrease the absolute value of the torque output from the first motor suppresses a decrease in the rotation speed of the engine or increases the rotation speed of the engine. As a result, this configuration suppresses the occurrence of an engine stall during the battery-less drive.

DESCRIPTION OF EMBODIMENTS

The following describes some aspects of the disclosure with reference to embodiments.

Figure 1:
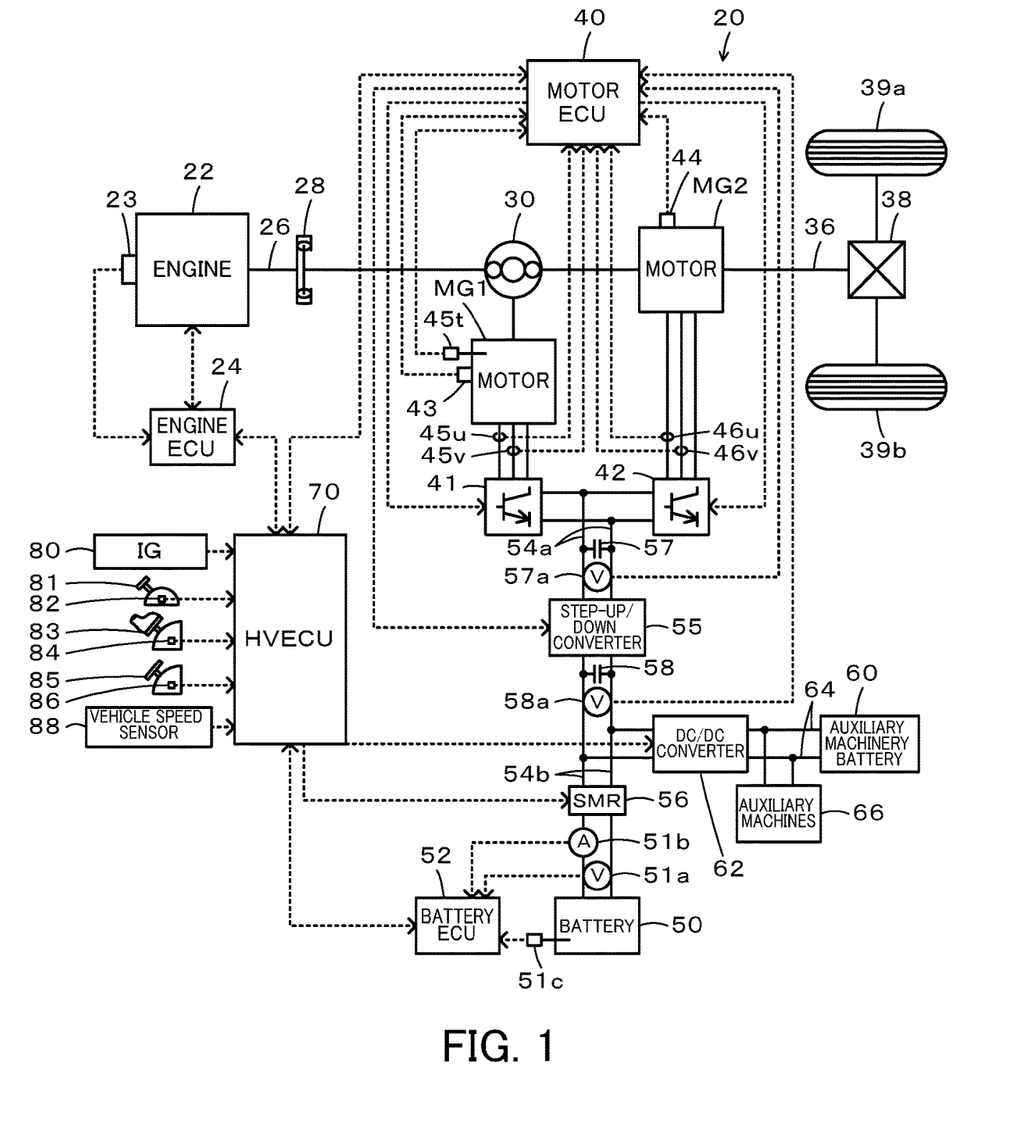
FIG. 1 is a configuration diagram illustrating the schematic configuration of a hybrid vehicle according to an embodiment of the present disclosure.
Figure 2:
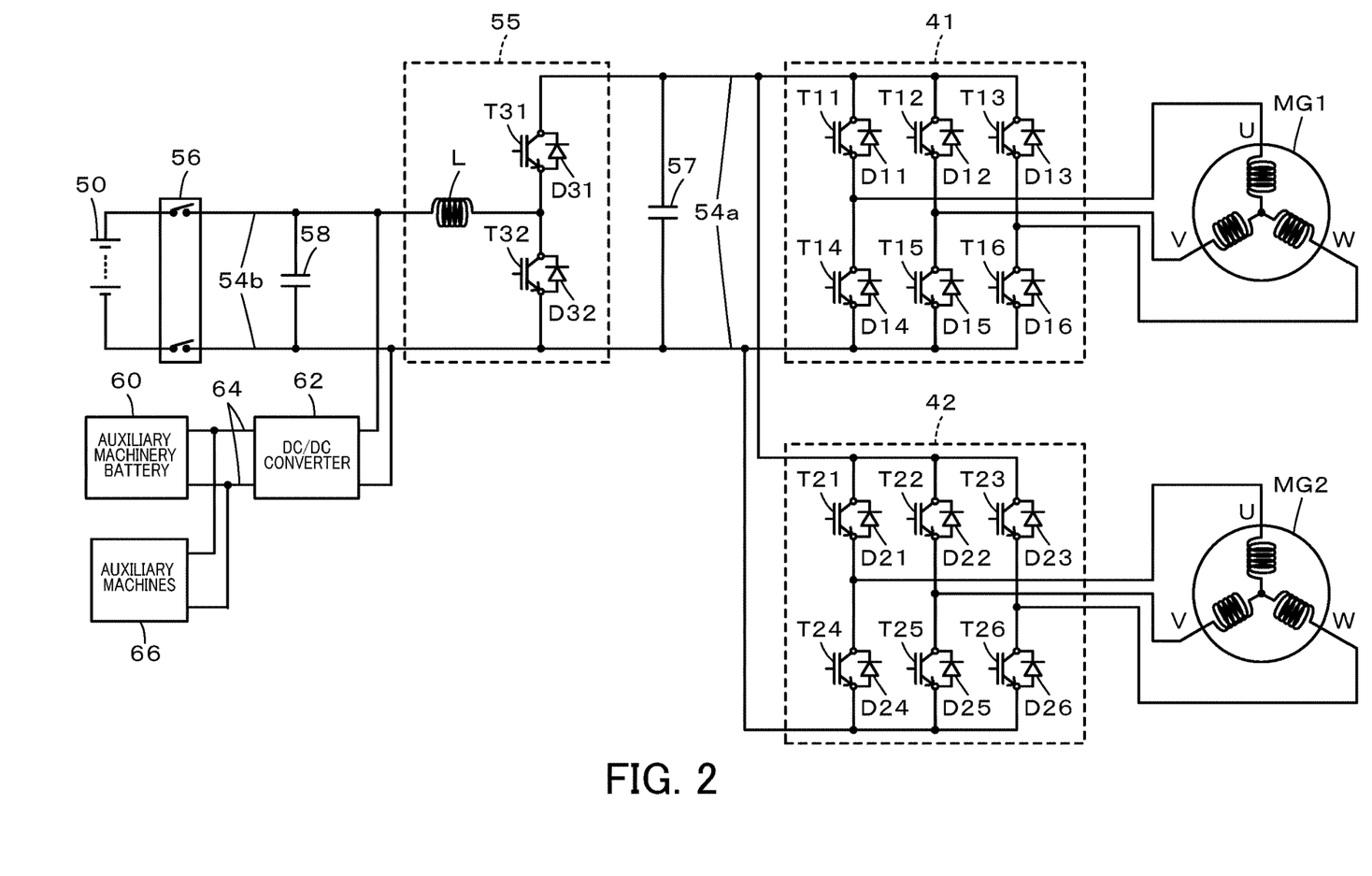
FIG. 2 is a configuration diagram illustrating the schematic configuration of an electric driving system including motors MG1 and MG2.

FIG. 1 is a configuration diagram illustrating the schematic configuration of a hybrid vehicle 20 according to one embodiment of the present disclosure. FIG. 2 is a configuration diagram illustrating the schematic configuration of an electric driving system including motors MG1 and MG2. As illustrated, the hybrid vehicle 20 of the embodiment includes an engine 22, a planetary gear 30, the motors MG1 and MG2, inverters 41 and 42, a step-up/down converter 55, a battery 50 serving as a power storage device, a system main relay 56, an auxiliary machinery battery 60, and a hybrid electronic control unit (hereinafter referred to as "HVECU") 70.

The engine 22 is configured as an internal combustion engine that output power using, for example, gasoline or light oil as fuel. This engine 22 is operated and controlled by an engine electronic control unit (hereinafter referred to as engine ECU) 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22, for example, a crank angle θcr from a crank position sensor 23 configured to detect the rotational position of a crankshaft 26 of the engine 22, are input into the engine ECU 24 via the input port. Various control signals for operation control of the engine 22 are output from the engine ECU 24 via the output port. The engine ECU 24 is connected with the HVECU 70 via the respective communication ports. The engine ECU 24 calculates a rotation speed Ne of the engine 22, based on the crank angle θcr from the crank position sensor 23.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 linked with drive wheels 39a and 39b via a differential gear 38. The planetary gear 30 also includes a carrier that is connected, via a damper 28, with the crankshaft 26 of the engine 22.

The motor MG1 is configured as a synchronous generator motor including a rotor with permanent magnets embedded therein and a stator with three-phase coils wound thereon and includes the rotor that is connected with the sun gear of the planetary gear 30 as described above. The motor MG2 is also configured as a synchronous generator motor like the motor MG1 and includes a rotor that is connected with the driveshaft 36.

As shown in FIG. 2, the inverter 41 is connected with high voltage-side power lines 54a and includes six transistors T11 to T16 and six diodes D11 to D16 that are respectively connected in an opposite direction to and in parallel to the six transistors T11 to T16. The transistors T11 to T16 are arranged in pairs, such that two transistors in each pair respectively serve as a source and as a sink relative to a positive electrode line and a negative electrode line of the nigh voltage-side power lines 54a. The respective phases of the three-phase coils (U phase, V phase and W phase) of the motor MG1 are connected with connection points of the respective pairs of the transistors T11 to T16. Accordingly, when a voltage is applied to the inverter 41, a motor electronic control unit (hereinafter referred to as "motor ECU") 40 regulates the rates of ON times of the respective pairs of the transistors T11 to T16 to provide a rotating magnetic field in the three-phase coils and thereby rotate and drive the motor MG1. Like the inverter 41, the inverter 42 is also connected with the high voltage-side power lines 54a and includes six transistors T21 to T26 and six diodes D21 to D26. When a voltage is applied to the inverter 42, the motor ECU 40 regulates the rates of ON times of the respective pairs of the transistors T21 to T26 to provide a rotating magnetic field in the three-phase coils and thereby rotate and drive the motor MG2.

The step-up/down converter 55 is connected with the nigh voltage-side power lines 54a and with low voltage-side power lines 54b and includes two transistors T31 and T32, two diodes D31 and D32 respectively connected in an opposite direction to and in parallel to the two transistors T31 and T32, and a reactor L. The transistor T31 is connected with the positive electrode line of the high voltage-side power lines 54a. The transistor T32 is connected with the transistor T31 and with negative electrode lines of the high voltage-side power lines 54a and of the low voltage-side power lines 54b. The reactor L is connected with a connection point between the transistors T31 and T32 and with a positive electrode line of the low voltage-side power lines 54b. The motor ECU 40 regulates the rates of ON times of the transistors T31 and T32, such that the step-up/down converter 55 steps up the voltage of an electric power on the low voltage-side power lines 54b and supplies the electric power of the stepped-up voltage to the high voltage-side power lines 54a, while stepping down the voltage of an electric power on the high voltage-side power lines 54a and supplying the electric power of the stepped-down voltage to the low voltage-side power lines 54b. A capacitor 57 for smoothing is mounted to the positive electrode line and the negative electrode line of the high voltage-side power lines 54a. A capacitor 58 for smoothing is mounted to the positive electrode line and the negative electrode line of the low voltage-side power lines 54b.

The motor ECU 40 is configured as a CPU-based microprocessor and includes a ROM configured to store processing programs, a RAM configured to temporarily store data, input/output ports and a communication port, in addition to the CPU, although not being illustrated. As shown in FIG. 1, signals from various sensors required for drive control of the motors MG1 and MG2 and the step-up/down converter 55 are input into the motor ECU 40 via the input port. The signals input into the motor ECU 40 include, for example, rotational positions θm1 and θm2 from rotational position detection sensors 43 and 44 configured to detect the rotational positions of the respective rotors of the motors MG1 and MG2, phase currents Iu1, Iv1, Iu2 and Iv2 from current sensors 45u, 45v, 46u and 46v configured to detect electric currents flowing in the respective phases of the motors MG1 and MG2, and a motor temperature tm1 from a temperature sensor 45t mounted to the motor MG1. The input signals also include a voltage VH of the capacitor 57 (high voltage-side power lines 54a) from a voltage sensor 57a mounted between terminals of the capacitor 57 and a voltage VL of the capacitor 58 (low voltage-side power lines 54b) from a voltage sensor 58a mounted between terminals of the capacitor 58. Various control signals for drive control of the motors MG1 and MG2 and the step-up/down converter 55 are output from the motor ECU 40 via the output port. The signals output from the motor ECU 40 include, for example, switching control signals to the transistors T11 to T16 of the inverter 41 and the transistors T21 to T26 of the inverter 42 and switching control signals to the transistors T31 and T32 of the step-up/down converter 55. The motor ECU 40 is connected with the HVECU 70 via the respective communication ports. The motor ECU 40 calculates electrical angles θe1 and θe2 and rotation speeds Nm1 and Nm2 of the respective motors MG1 and MG2, based on the rotational positions θm1 and θm2 of the respective rotors of the motors MG1 and MG2 input from the rotational position detection sensors 43 and 44.

The battery 50 is configured by, for example, a lithium ion rechargeable battery or a nickel metal hydride battery and is connected with the low voltage-side power lines 54b. This battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. Signals from various sensors required for management of the battery 50 are input into the battery ECU 52 via the input port. The signals input into the battery ECU 52 include, for example, a voltage Vb of the battery 50 from a voltage sensor 51a placed between terminals of the battery 50, an electric current Ib of the battery 50 from a current sensor 51b mounted to an output terminal of the battery 50, and a temperature Tb of the battery 50 from a temperature sensor 51c mounted to the battery 50. The battery ECU 52 is connected with the HVECU 70 via the respective communication ports. The battery ECU 52 calculates a state of charge SOC, based on an integrated value of the electric current Ib of the battery 50 input from the current sensor 51b. The state of charge SOC denotes a ratio of the capacity of electric power dischargeable from the battery 50 to the overall capacity of the battery 50.

The system main relay 56 is provided on the battery 50-side of the capacitor 58 in the low voltage-side power lines 54b. This system main relay 56 is controlled on and off by the HVECU 70 to connect and disconnect the battery 50 with and from the step-up/down converter 55-side.

The auxiliary machinery battery 60 is configured by a storage battery having a lower voltage than that of the battery 50, for example, a lead acid storage battery, and is connected with auxiliary machinery power lines 64. The auxiliary machinery power lines 64 are connected with the low voltage-side power lines 54b via a DC/DC converter 62. The DC/DC converter 62 serves to convert an electric power on the low voltage-side power lines 54b into an electric power of a low voltage and supply the electric power of the low voltage to the auxiliary machinery power lines 64. Auxiliary machines 66 such as a steering device are connected with the auxiliary machinery power lines 64.

The HVECU 70 is configured as a CPU-based microprocessor and includes a ROM configured to store processing programs, a RAM configured to temporarily store data, input/output ports and a communication port, in addition to the CPU, although not being illustrated. The HVECU 70 obtains signals input from various sensors via the input port. The signals input into the HVECU 70 include, for example, an ignition signal from an ignition switch 80 and a shift position SP from a shift position sensor 82 configured to detect an operating position of a shift lever 81. The input signals further include, for example, an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. The HVECU 70 outputs, for example, a drive control signal to the system main relay 56 and a drive control signal to the DC/DC converter 62 via the output port. The HVECU 70 is connected with the engine ECU 24, the motor ECU 40 and the battery ECU 52 via the respective communication ports as described above.

The hybrid vehicle 20 of the embodiment having the above configuration may be driven, for example, in a hybrid drive mode (HV drive mode), in a motor drive motor (EV drive mode), or in a battery-less drive mode. The HV drive mode denotes a drive mode in which the hybrid vehicle 20 is driven with operating the engine 22 and driving the motors MG1 and MG2. The EV drive mode denotes a drive mode in which the hybrid vehicle 20 is driven with stopping operation of the engine 22 and driving the motor MG2. The battery-less drive mode denotes a drive mode in which the hybrid vehicle 20 is driven with operating the engine 22 and driving the motors MG1 and MG2 in the state that the battery 50 is separated by the system main relay 56.

Figure 3:
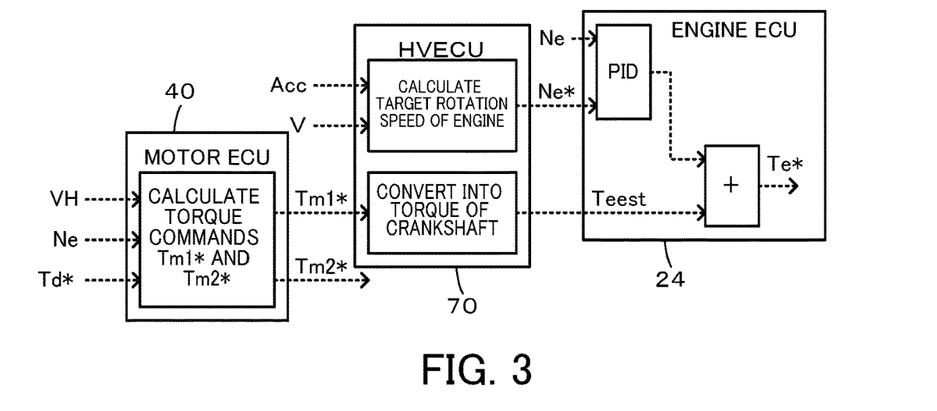
FIG. 3 is a block diagram illustrating one example of control blocks during a run in the battery-less drive mode.

FIG. 3 is a block diagram illustrating one example of control blocks during a run in the battery-less drive mode. In the battery-less drive mode, the HVECU 70 sets a required torque Td* that is to be output to the driveshaft 36 and a target rotation speed Ne* of the engine 22, based on the accelerator position Acc from the accelerator pedal position sensor 84 and the vehicle speed V from the vehicle speed sensor 88. The required torque Td* may be set, for example, by reading a required torque Td* corresponding to a given accelerator position Acc and a given vehicle speed V from a map determined in advance to indicate a relationship between the accelerator position Acc, the vehicle speed V and the required torque Td*. The target rotation speed Ne* may be set, for example, by reading a target rotation speed Ne* corresponding to a given vehicle speed V from a map determined in advance to indicate a relationship between the vehicle speed V and the target rotation speed Ne* such as to increase the target rotation speed Ne* with an increase in vehicle speed V. The HVECU 70 sends the required torque Td* to the motor ECU 40, while sending the target rotation speed Ne* to the engine ECU 24. The motor ECU 40 obtains the inputs of the voltage VH of the high voltage-side power lines 54a, the rotation speed Ne of the engine 22 and the required torque Td* and calculates a torque command Tm1* of the motor MG1 and a torque command Tm2* of the motor MG2. The torque command Tm1* of the motor MG1 may be calculated, for example, as a torque required for the sun gear of the planetary gear 30 when a torque obtained by dividing a required power P* by the target rotation speed Ne* is applied to the carrier of the planetary gear 30. The required power F* is calculated by adding an auxiliary machinery power Ph required for the auxiliary machines 66 to a driving power Pdrv that is obtained by multiplying the required torque Td* by a rotation speed Nd of the driveshaft 36 (which corresponds to the rotation speed Nm2 of the motor MG2). The torque command Tm2* of the motor MG2 may be calculated, for example, by subtracting the auxiliary machinery power Ph from a product of the torque command Tm1* and the rotation speed Nm1 of the motor MG1 and dividing the difference by the rotation speed Nm2 of the motor MG2. The motor ECU 40 performs switching control of the switching elements included in the inverter 41, such that a torque corresponding to the torque command Tm1* is output from the motor MG1, and performs switching control of the switching elements included in the inverter 42, such that a torque corresponding to the torque command Tm2* is output from the motor MG2. The motor ECU 40 sends the torque command Tm1* to the HVECU 70. When receiving the torque command Tm1*, the HVECU 70 calculates a torque that is to be output from the engine 22 to the crankshaft 26 under application of the torque command Tm1* to the sun gear of the planetary gear 30, as an estimated torque Teest and sends the estimated torque Teest to the engine ECU 24. The engine ECU 24 calculates a correction value by feedback control based on a difference between the target rotation speed Ne* from the HVECU 70 and the rotation speed Ne of the engine 22 (actual rotation speed) and sets a target torque Te* of the engine 22 by adding the calculated correction value to the estimated torque Teest. The engine ECU 24 performs intake air flow control, fuel injection control and ignition control of the engine 22, such as to cause the engine 22 to output the target torque Te*. The rotation speed Ne of the engine 22 is converged to the target rotation speed Ne* by feedback control based on the difference between the target rotation speed Ne* and the rotation speed Ne (actual rotation speed).

Figure 4:
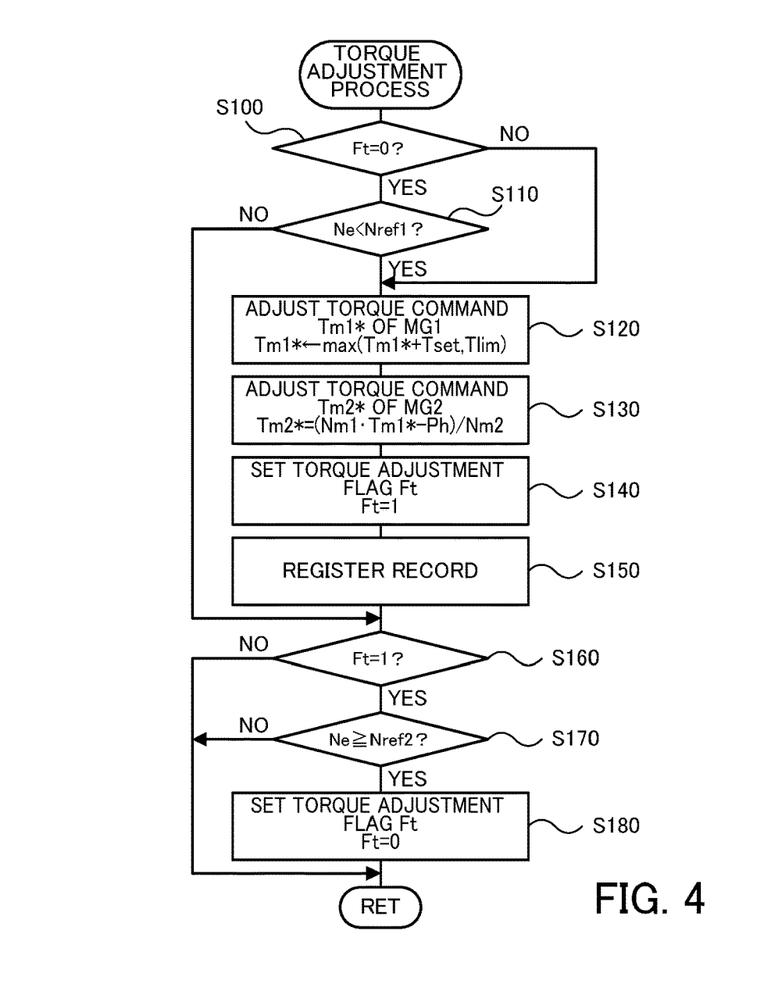
FIG. 4 is a flowchart showing one example of a torque adjustment process performed by a motor ECU in the battery-less drive mode.

The following describes a series of operations to suppress the occurrence of an engine stall during a run in the ID battery-less drive mode. FIG. 4 is a flowchart showing one example of a torque adjustment process performed by the motor ECU 40 in the battery-less drive mode. This routine is performed repeatedly every time the torque commands Tm1* and Tm2* are calculated.

When the torque adjustment process is triggered, the motor ECU 40 first determines whether a torque adjustment flag Ft is equal to a value 0 (step S100). The torque adjustment flag Ft is set to a value 1 when torque adjustment is performed in the torque adjustment process, while being set to a value 0 when the torque adjustment is not performed. In the ordinary state without the torque adjustment, the value 0 is set to the torque adjustment flag Ft. Assuming that the torque adjustment is not performed, it is determined at step S100 that the torque adjustment flag Ft is equal to the value 0.

When it is determined at step S100 that the torque adjustment flag Ft is equal to the value 0, the motor ECU 40 subsequently determines whether the rotation speed Ne of the engine 22 is lower than a first predetermined rotation speed Nref1 (step S110). The first predetermined rotation speed Nref1 is set as a slightly higher rotation speed than a minimum rotation speed that allows for autonomous driving of the engine 22 and may be, for example, 900 rpm, 1000 rpm or 1100 rpm. The first predetermined rotation speed Nref1 is accordingly a rotation speed that is lower than the target rotation speed Ne* of the engine 22 set based on the vehicle speed V. The rotation speed Ne of the engine 22 becomes lower than the first predetermined rotation speed Nref, for example, in the state that the rotation speed Ne of the engine 22 is suppressed and reduced by control with setting a smaller torque (larger torque as an absolute value) to the torque command Tm1* of the motor MG1 accompanied with setting of a large required torque Td* in response to the driver's pressing down the accelerator pedal 83.

When it is determined at step S110 that the rotation speed Ne of the engine 22 is lower than the first predetermined rotation speed Nref1, the motor ECU 40 determines the possibility of an engine stall and performs the processing of steps S120 to S150 (torque adjustment). The motor ECU 40 first sets the greater (smaller as an absolute value) between a lower limit torque Tlim and a total torque of the calculated torque command Tm1* of the motor MG1 and a predetermined torque Tset, to the torque command Tm1* of the motor MG1 (step S120). The predetermined torque Tset may be a torque of a positive value, for example, 20% or 30% of the rated maximum torque of the motor MG1. Since the torque command Tm1* is a negative value, the total torque of the torque command Tm1* of the motor MG1 and the predetermined torque Tset is smaller than the torque command Tm1* by the predetermined torque Tset as the absolute value. The lower limit torque Tlim used may be a torque (torque of a negative value) smaller than the torque that is to be output from the motor MG2 when a maximum possible torque is output from the engine 22 that is operated at the rotation speed Ne. Accordingly, the processing of step S120 limits the total torque of the torque command Tm1* of the motor MG1 and the predetermined torque Tset (where the total torque is smaller than the torque command Tm1* by the predetermined torque Tset as the absolute value) with the lower limit torque Tlim. Such setting of the torque command Tm1* of the motor MG1 enables the rotation speed Ne of the engine 22 to be increased by feedback control of the engine ECU 24.

The motor ECU 40 subsequently calculates the torque command Tm2* of the motor MG2 by subtracting the auxiliary machinery power Ph from the product of the set torque command Tm1* of the motor MG1 and the rotation speed Nm1 of the motor MG1 and dividing the difference by the rotation speed Nm2 of the motor MG2 (step S130). The motor ECU 40 then sets the value 1 to the torque adjustment flag Ft (step S140) and registers a record of the torque adjustment (step S150).

Figure 5:
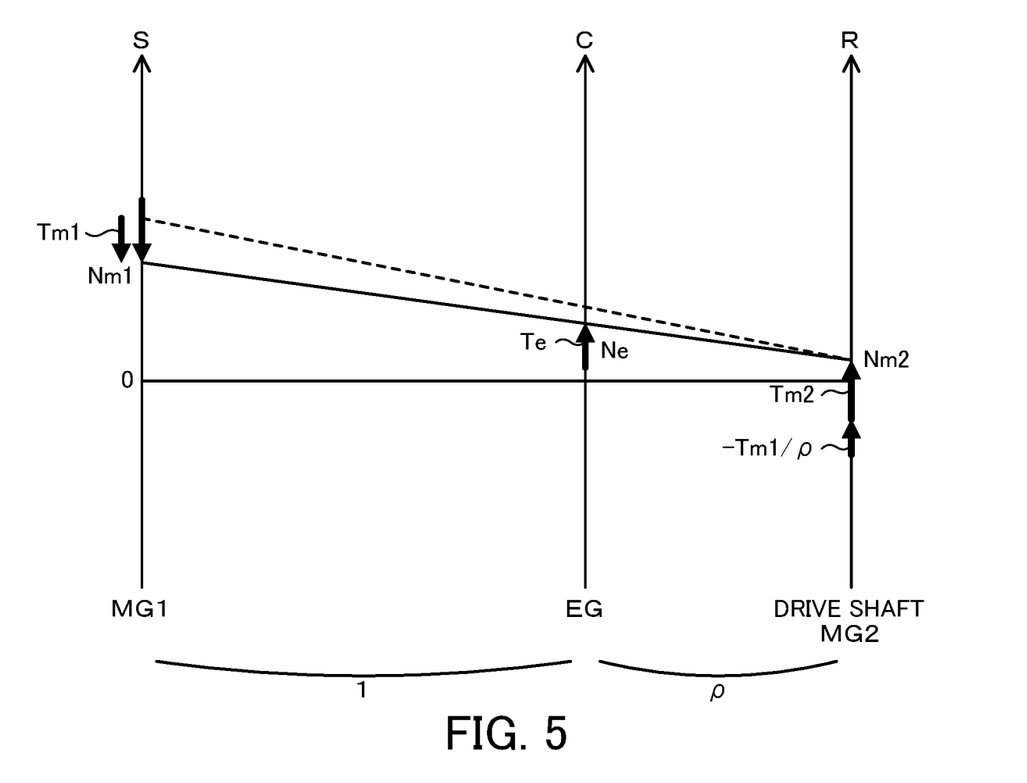
FIG. 5 is a diagram illustrating one example of an alignment chart when torque adjustment is performed.

FIG. 5 is a diagram illustrating one example of an alignment chart when torque adjustment is performed. In FIG. 5, an S axis on the left side indicates the rotation speed of the sun gear of the planetary gear 30 that is equal to the rotation speed Nm1 of the motor MG1. A C axis indicates the rotation speed of the carrier of the planetary gear 30 that is equal to the rotation speed Ne of the engine 22. An R axis indicates the rotation speed of the ring gear of the planetary gear 30 (i.e., the rotation speed of the driveshaft 36) that is equal to the rotation speed Nm2 of the motor MG2. In FIG. 5, "ρ" represents a gear ratio (number of teeth of the sun gear/number of teeth of the ring gear) of the planetary gear 30. Additionally, two thick arrows on the R axis indicate a torque that is output from the motor MG1 and that is applied to the driveshaft 36 via the planetary gear 30 and a torque that is output from the motor MG2 and that is applied to the driveshaft 36. An upward thick arrow indicates a positive torque, and a downward thick arrow indicates a negative torque. A solid line graph indicates the state prior to torque adjustment, and a broken line graph indicates the state after the torque adjustment. The torque adjustment is performed by reducing the absolute value of the torque command Tm1* of the motor MG1. Decreasing the downward torque on the S axis in the state of the solid line graph increases the rotation speed Ne of the engine 22 on the C axis to the state of the broken line graph. The rotation speed Ne of the engine 22 may thus be increased by reducing the absolute value of the torque command Tm1* of the motor MG1 in this manner. As a result, this suppresses the occurrence of an engine stall.

The motor ECU 40 subsequently determines whether the torque adjustment flag Ft is equal to the value 1 (step S160). The torque adjustment flag Ft is set equal to the value 1 when the torque adjustment is performed by the processing of steps S120 to S150. It is accordingly determined at step S160 that the torque adjustment flag Ft is equal to the value 1. In this case, the motor ECU 40 subsequently determines whether the rotation speed Ne of the engine 22 is equal to or higher than a second predetermined rotation speed Nref2 (step S170). The second predetermined rotation speed Nref2 is a value higher than the first predetermined rotation speed Nref1 and may be a higher rotation speed by, for example, 300 rpm, 400 rpm or 500 rpm than the first predetermined rotation speed Nref1. When the rotation speed Ne of the engine 22 is lower than the second predetermined rotation speed Nref2, the motor ECU 40 determines a need for further torque adjustment and once terminates the torque adjustment process. In this case, the motor ECU 40 determines that the torque adjustment flag Ft is not equal to the value 0 at step S100 and accordingly performs the processing of steps S120 to S150 (torque adjustment). Accordingly, the processing of steps S120 to S150 (torque adjustment) is performed repeatedly until the rotation speed Ne of the engine 22 becomes equal to or higher than the second predetermined rotation speed Nref2.

When the rotation speed He of the engine 22 is equal to or higher than the second predetermined rotation speed Nref2, on the other hand, the motor ECU 40 determines no need for further torque adjustment. The motor ECU 40 sets the value 0 to the torque adjustment flag Ft (step S180) and then terminates the torque adjustment process. In this case, the motor ECU 40 determines that the torque adjustment flag Ft is equal to the value 0 at step S100 and determines that the rotation speed Ne of the engine 22 is equal to or higher than the first predetermined rotation speed Nref1 at step S110. The motor ECU 40 accordingly proceeds to step S160. Since the torque adjustment flag Ft is equal to the value 0, the motor ECU 40 obtains a negative answer at step S160 and then terminates the torque adjustment process. Accordingly, when the torque adjustment flag Ft is set equal to the value 0 and the rotation speed Ne of the engine 22 is equal to or higher than the first predetermined rotation speed Nref1, the torque adjustment process is terminated without further processing of steps S120 to S150 (torque adjustment).

Figure 6:
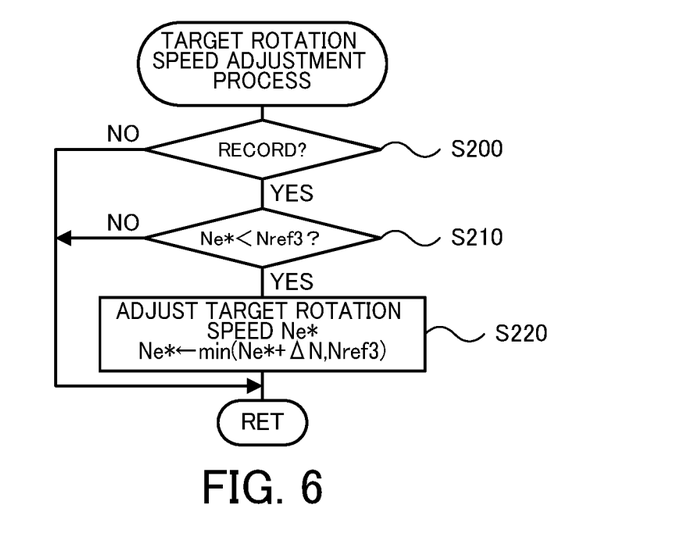
FIG. 6 is a flowchart showing one example of a target rotation speed adjustment process performed by a HVECU.

In the hybrid vehicle 20 of the embodiment, when the torque adjustment is performed in the battery-less drive mode, the HVECU 70 adjusts the target rotation speed Ne* of the engine 22. FIG. 6 is a flowchart showing one example of a target rotation speed adjustment process performed by the HVECU 70.

When the target rotation speed adjustment process is triggered, the HVECU 70 determines whether there is a record of torque adjustment (step S200). This determines whether a record of torque adjustment has been registered. When it is determined that there is no record of torque adjustment, the HVECU 70 determines no need for adjustment of the target rotation speed Ne* of the engine 22 and terminates this process. When it is determined that there is a record of torque adjustment, on the other hand, the HVECU 70 subsequently determines whether the target rotation speed Ne* is lower than a third predetermined rotation speed Nref3 (step S210). The third predetermined rotation speed Nref3 is a rotation speed higher than the first predetermined rotation speed Nref1 and is a rotation speed that is unlikely to cause an engine stall irrespective of the setting of the torque command Tm1* of the motor MG1. When the target rotation speed Ne* is equal to or higher than the third predetermined rotation speed Nref3, the HVECU 70 determines substantially no possibility of the occurrence of an engine stall and terminates this process. When the target rotation speed Ne* is lower than the third predetermined rotation speed Nref3, on the other hand, the HVECU 70 determines the possibility of the occurrence of an engine stall. The HVECU 70 sets the lower between the third predetermined rotation speed Nref3 and a rotation speed increased by an increment rotation speed ΔN from the target rotation speed Ne*, to the target rotation speed Ne* (step S220) and then terminates this process. When torque adjustment is performed, this process increases the target rotation speed Ne* and sets a large correction value in feedback control, thus accelerating an increase in rotation speed Ne of the engine 22. After stop of the torque adjustment, this process suppresses the rotation speed He of the engine 22 from becoming lower than the first predetermined rotation speed Nref1 again.

Figure 7:
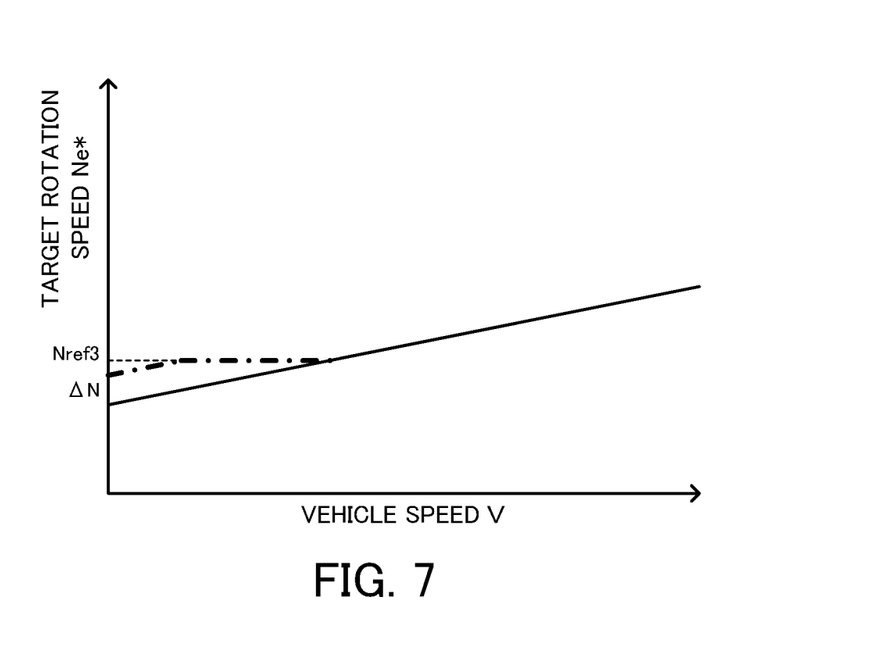
FIG. 7 is a diagram showing one example of a relationship between a vehicle speed and a target rotation speed.

FIG. 7 is a diagram showing one example of a relationship between the vehicle speed V and the target rotation speed Ne*. A solid line curve indicates a relationship between the vehicle speed V and the target rotation speed Ne* without adjustment of the target rotation speed Ne*. A one-dot chain line curve indicates a relationship between the vehicle speed V and the target rotation speed Ne* with adjustment of the target rotation speed Ne*. When adjustment of the target rotation speed Ne* is not performed, the target rotation speed Ne* increases with an increase in vehicle speed V. When adjustment of the target rotation speed Ne* is performed (i.e., when there is a record of torque adjustment), on the other hand, in a range of low vehicle speed V, when the rotation speed increased by the increment rotation speed ΔN from the solid line curve is lower than the third predetermined rotation speed Nref3, the rotation speed increased by the increment rotation speed ΔN is set to the target rotation speed Ne*. When the rotation speed increased by the increment rotation speed ΔN from the solid line curve is equal to or higher than the third predetermined rotation speed Nref3, the third predetermined rotation speed Nref3 is set to the target rotation speed Ne*. In a range of high vehicle speed V, when the solid line curve is equal to or higher than the third predetermined rotation speed Nref3, the rotation speed on the solid line curve is set to the target rotation speed Ne*.

As described above, when the rotation speed Ne of the engine 22 becomes lower than the first predetermined rotation speed Nref1 in the battery-less drive mode, the hybrid vehicle 20 of the embodiment performs torque adjustment to increase the torque command Tm1* of the motor MG1 (i.e., to decrease as the absolute value). This increases the rotation speed Ne of the engine 22 and suppresses the occurrence of an engine stall. As a result, this suppresses the occurrence of an engine stall during a battery-less drive.

When the rotation speed Ne of the engine 22 becomes equal to or higher than the second predetermined rotation speed Nref2 by the torque adjustment to increase the torque command Tm1* of the motor MG1 (i.e., to decrease as the absolute value), the hybrid vehicle 20 of the embodiment stops the torque adjustment for increasing the torque command Tm1* of the motor MG1 (i.e., decreasing as the absolute value). This suppresses continuation of the torque adjustment.

After the torque adjustment to increase the torque command Tm1* of the motor MG1 (i.e., to decrease as the absolute value), when the target rotation speed Ne* is lower than the third predetermined rotation speed Nref3, the hybrid vehicle 20 of the embodiment sets the lower between the third predetermined rotation speed Nref3 and the rotation speed increased by the increment rotation speed ΔN from the target rotation speed Ne*, to the target rotation speed Ne*. When torque adjustment is performed, this increases the correction value in feedback control and thereby accelerates an increase in rotation speed Ne of the engine 22. After stop of the torque adjustment, this suppresses the rotation speed Ne of the engine 22 from becoming lower than the first predetermined rotation speed Nref1 again. Additionally, when the rotation speed Ne of the engine 22 is equal to or higher than the third predetermined rotation speed Nref3, the hybrid vehicle 20 of the embodiment does not increase the target rotation speed Ne*. This suppresses an unnecessary increase of the target rotation speed Ne*.

The hybrid vehicle 20 of the embodiment is provided with the step-up/down converter 55. A modified configuration may exclude the step-up/down converter.

The hybrid vehicle 20 of the embodiment is provided with the engine ECU 24, the motor ECU 40, the battery ECU 52 and the HVECU 70. According to a modification, at least two of these may be configured as a single electronic control unit.

In the hybrid vehicle of this aspect, during the torque adjustment control, when the rotation speed of the engine becomes equal to or higher than a second predetermined rotation speed that is higher than the first predetermined rotation speed, the control device may stop the torque adjustment control. This configuration suppresses continuation of the torque adjustment control that decreases the absolute value of the torque output from the first motor.

In the hybrid vehicle of another aspect, the absolute value of the torque output from the first motor in the torque adjustment control may be a smaller value than a torque converted to the rotating shaft of the first motor from a maximum torque which the engine is allowed to output at the first predetermined rotation speed. This configuration performs the torque adjustment control to more reliably increase the rotation speed of the engine.

In the hybrid vehicle of another aspect, during the battery-less drive control, when there is a record of the torque adjustment control, the control device may control the engine such that the engine is autonomously operated at a rotation speed higher than the autonomous operation rotation speed. This configuration suppresses the torque adjustment control from being performed during subsequent execution of the battery-less drive control.

The following describes the correspondence relationship between the primary components of the embodiment and the primary components of the disclosure described in Summary. The motor MG1 of the embodiment corresponds to the "first motor", the engine 22 of the embodiment corresponds to the "engine", the planetary gear 30 of the embodiment corresponds to the "planetary gear mechanism", the motor MG2 of the embodiment corresponds to the "second motor", the battery 50 of the embodiment corresponds to the "battery", and the system main relay 56 of the embodiment corresponds to the "system main relay". The HVECU 70, the engine ECU 24 and the motor ECU 40 correspond to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is applicable to the manufacturing industries of the hybrid vehicle and so on.

The invention claimed is:

1. A hybrid vehicle, comprising:
a first motor configured to input and output power;
an engine;
a planetary gear mechanism configured such that three shafts, i.e., a rotating shaft of the first motor, an output shaft of the engine and a driveshaft coupled with an axle are connected with three rotational elements of the planetary gear in this sequence in an alignment chart;
a second motor configured to input and output power from and to the driveshaft;
a battery connected with power lines, which are connected with the first motor and the second motor, and configured to transmit electric power to and from the first motor and the second motor;
a system main relay configured to connect and disconnect the battery with and from the power lines; and
a control device configured to perform battery-less drive control when the hybrid vehicle is driven in an off state of the system main relay, where in the battery-less drive control controls the engine such that the engine is autonomously operated at an autonomous operation rotation speed, controls the first motor such that a torque based on a driving force required for a run of the hybrid vehicle is output from the first motor, and controls the second motor such that an electric power by subtracting an auxiliary machinery power from an electric power charged or discharged by the first motor is charged or discharged by the second motor, wherein
during the battery-less drive control, when a rotation speed of the engine becomes lower than a first predetermined rotation speed that is lower than the autonomous operation rotation speed, the control device performs torque adjustment control to decrease an absolute value of the torque output from the first motor.

2. The hybrid vehicle according to claim 1,
wherein during the torque adjustment control, when the rotation speed of the engine becomes equal to or higher than a second predetermined rotation speed that is higher than the first predetermined rotation speed, the control device stops the torque adjustment control.

3. The hybrid vehicle according to claim 1,
wherein the absolute value of the torque output from the first motor in the torque adjustment control is a smaller value than a torque converted to the rotating shaft of the first motor from a maximum torque which the engine is allowed to output at the first predetermined rotation speed.

4. The hybrid vehicle according to claim 1,
wherein during the battery-less drive control, when there is a record of the torque adjustment control, the control device controls the engine such that the engine is autonomously operated at a rotation speed higher than the autonomous operation rotation speed.

5. The hybrid vehicle according to claim 2,
wherein the absolute value of the torque output from the first motor in the torque adjustment control is a smaller value than a torque converted to the rotating shaft of the first motor from a maximum torque which the engine is allowed to output at the first predetermined rotation speed.

6. The hybrid vehicle according to claim 2,
wherein during the battery-less drive control, when there is a record of the torque adjustment control, the control device controls the engine such that the engine is autonomously operated at a rotation speed higher than the autonomous operation rotation speed.

7. The hybrid vehicle according to claim 3,
wherein during the battery-less drive control, when there is a record of the torque adjustment control, the control device controls the engine such that the engine is autonomously operated at a rotation speed higher than the autonomous operation rotation speed.

* * * * *

UNITED STATES PATENT AND TRADEMARK OFFICE
CERTIFICATE OF CORRECTION

PATENT NO. : 10,875,520 B2
APPLICATION NO. : 16/226343
DATED : December 29, 2020
INVENTOR(S) : Yasuaki Okabe Page 1 of 1

It is certified that error appears in the above-identified patent and that said Letters Patent is hereby corrected as shown below:

In the Specification

In Column 4, Line(s) 12, delete "nigh" and insert --high--, therefor.

In Column 4, Line(s) 29, delete "nigh" and insert --high--, therefor.

In Column 7, Line(s) 1, delete "power F\*" and insert --power P\*--, therefor.

In Column 9, Line(s) 33, delete "speed He" and insert --speed Ne--, therefor.

In Column 10, Line(s) 25, delete "speed He" and insert --speed Ne--, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*